United States Patent
Burch, Jr. et al.

(10) Patent No.: US 8,535,014 B2
(45) Date of Patent: Sep. 17, 2013

(54) SYSTEM AND METHOD FOR EXPLOSION-PROOF PUMP

(75) Inventors: Thomas Joseph Burch, Jr., Shepherdsville, KY (US); Jay Edward Collins, Louisville, KY (US); James Christopher Erhart, Louisville, KY (US); Jason Dean Fletcher, New Albany, IN (US)

(73) Assignee: Zoeller Pump Company, LLC, Louisville, KY (US)

( * ) Notice: Subject to any disclaimer, the term of this patent is extended or adjusted under 35 U.S.C. 154(b) by 1022 days.

(21) Appl. No.: 12/144,043

(22) Filed: Jun. 23, 2008

(65) Prior Publication Data

US 2009/0317259 A1    Dec. 24, 2009

(51) Int. Cl.
*F04B 49/04*    (2006.01)
(52) U.S. Cl.
USPC .......................................................... 417/40
(58) Field of Classification Search
USPC ............. 417/40, 53, 423.11, 423.14; 73/308, 73/314
See application file for complete search history.

(56) References Cited

U.S. PATENT DOCUMENTS

| | | | | |
|---|---|---|---|---|
| 2,752,461 A * | 6/1956 | Euler | | 200/543 |
| 2,927,174 A * | 3/1960 | Murray | | 200/84 B |
| 3,246,110 A * | 4/1966 | Hermanson et al. | | 200/314 |
| 3,264,443 A * | 8/1966 | Kelly et al. | | 200/331 |
| 3,280,750 A * | 10/1966 | White | | 417/357 |
| 3,435,290 A * | 3/1969 | Lyman | | 361/33 |
| 3,686,451 A * | 8/1972 | Pottharst, Jr. | | 200/84 R |
| 3,700,359 A * | 10/1972 | Vanderjagt | | 417/404 |
| 3,737,752 A * | 6/1973 | Strachan | | 318/471 |
| 3,776,666 A * | 12/1973 | Ludwig | | 417/411 |
| 3,822,967 A * | 7/1974 | Cade et al. | | 417/368 |
| 3,897,172 A * | 7/1975 | Hall | | 417/40 |
| 4,275,995 A * | 6/1981 | Taylor | | 417/40 |
| 4,324,532 A | 4/1982 | Knife | | |
| 4,335,286 A * | 6/1982 | Nelson | | 200/302.1 |
| 4,752,188 A * | 6/1988 | Gurega | | 417/40 |
| 5,055,000 A * | 10/1991 | Akhter | | 417/40 |
| 5,155,311 A | 10/1992 | Utke | | |
| 5,173,019 A * | 12/1992 | Sdano | | 415/118 |
| 5,324,171 A * | 6/1994 | Cook | | 417/40 |
| 5,562,422 A | 10/1996 | Ganzon et al. | | |
| 5,571,001 A * | 11/1996 | Fukuda et al. | | 417/423.3 |
| 5,591,019 A * | 1/1997 | Brown | | 417/422 |
| 5,667,362 A * | 9/1997 | Murai et al. | | 417/41 |
| 5,752,812 A * | 5/1998 | Brown | | 417/422 |
| 5,775,877 A * | 7/1998 | Genz | | 417/41 |
| 6,129,529 A * | 10/2000 | Young et al. | | 417/423.3 |
| 6,203,281 B1 | 3/2001 | Gurega | | |
| 6,461,114 B1 * | 10/2002 | Lin | | 417/40 |

(Continued)

OTHER PUBLICATIONS

"Approval Standard for Explosionproof Electrical Equipment General Requirements; Class No. 3615" FM Approvals LLC, Aug. 2006.

*Primary Examiner* — Charles Freay
*Assistant Examiner* — Amene Bayou
(74) *Attorney, Agent, or Firm* — Wyatt, Tarrant & Combs, LLP; Stephen C. Hall

(57) ABSTRACT

A System and Method for Explosion-Proof Pump is provided that includes a component being mated to and sealed against an adjacent component. An embodiment provides that the component is a switch housing having a cavity formed therein. A switch is secured in the cavity and the adjacent component is selected from the group access plate and motor housing.

8 Claims, 5 Drawing Sheets

(56) References Cited

U.S. PATENT DOCUMENTS

| | | | |
|---|---|---|---|
| 6,464,465 B2 * | 10/2002 | House | 417/40 |
| 6,655,930 B2 * | 12/2003 | Sato et al. | 417/373 |
| 7,131,330 B2 * | 11/2006 | Gurega | 73/306 |
| 7,264,449 B1 * | 9/2007 | Harned et al. | 417/36 |
| 2005/0079076 A1 | 4/2005 | Dolson | |
| 2005/0100459 A1 | 5/2005 | Dolson | |

* cited by examiner

SYSTEM AND METHOD FOR EXPLOSION-PROOF PUMP

MULTIPLE EMBODIMENTS AND ALTERNATIVES

Figure 1:
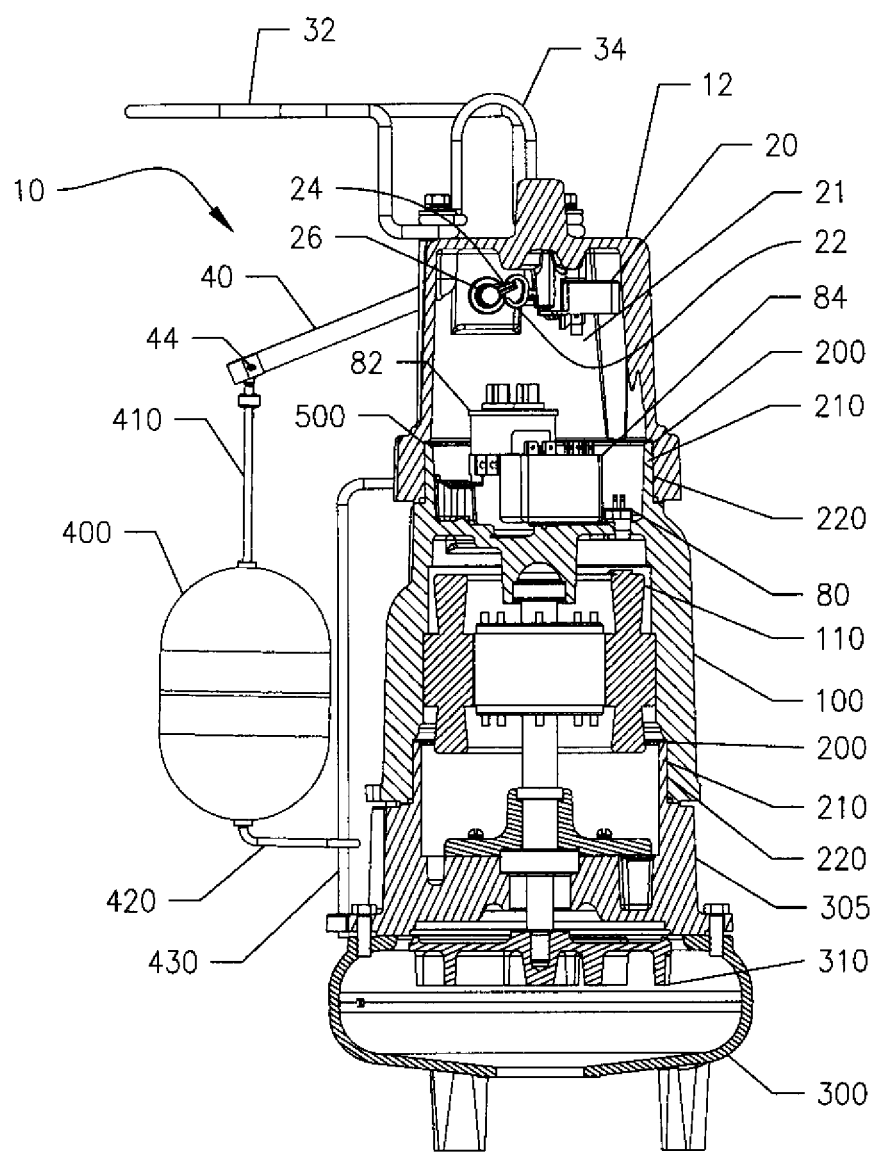
FIG. 1 is a sectioned side view showing details of an explosion-proof pump according to an embodiment among multiple embodiments and alternatives.

Multiple embodiments and alternatives are provided for a System and Method for Explosion-Proof Pump 10 that is rated for use in a hazardous environment as such is defined by relevant standards within the industry and field.

Those who work in the industry and field understand that industry standards organizations set standards and that products are submitted for testing in accordance with such standards in order to receive a certification from one or more of such industry standards organizations. One such organization is Underwriters Laboratories or "UL." Another is Factory Mutual Research of Norwood, Mass.; hereinafter, "FM". A pump 10 submitted for testing by FM and approved as rated to meet an FM standard may be said to have an FM Listing for that standard and be so marked.

The National Electric Code also provides code standards under NFPA 70 for electric motors and generators and submersible and nonsubmersible sewage pumps and systems.

Within these standards organizations and codes, Class I relates to Gasses and Vapors, Class II relates to Combustible Dusts and Class III relates to Flying Fibers. Division 1 relates to Ignitable concentrations of gasses, vapor-in-air mixtures, combustible dusts and flying fibers can exist during normal conditions. Division 2 relates to Ignitable concentrations of gasses, vapor-in-air mixtures, combustible dusts and flying fibers can exist during abnormal conditions. Under the Gas Groups, Group A relates to Acetylene and Group B relates to Hydrogen. Group C relates to Ethylene, and Group D relates to natural Gas. Under the Combustible Dust Groups, Group E relates to Conductive Dusts, Group F relates to Coal Dust and Group G relates to Grain Dusts.

Intrinsically safe controls include intrinsically safe switches that limit potential to low voltage levels so as to avoid creating a spark hazard. Such intrinsically safe switches may safely rest within the hazardous environment and are often utilized in order to provide explosion-proof pumps that operate safely within hazardous environments. However, resorting to the use of intrinsically safe switches imposes requirements to include an extra cost related to the switches and a control panel and related circuitry needed to control the intrinsically safe switches. Embodiments provided herein include explosion-proof pumps 10 that do not have to resort to the use of intrinsically safe switches.

Pumps 10 may have external controls, such as a remote mounted float-controlled switch. In the cases where pumps 10 are used to pump liquids, such pumps 10 may be desired to be submerged and to withstand being positioned completely under the level of such fluids. Such pumps 10 are submersible. Even further, embodiments of pumps 10 include those wherein high and/or low temperature soaking results in no degradation of pump performance or longevity, even when pump 10 is submerged. For example, a pump 10 may be placed within a hazardous environment, but have its switch 20 (off-on) remotely located either in or out of the hazardous environment as desired, and use sensor means such as, for example, a pair of floats (not shown) mounted within a tank or sump (not shown). Such an external control float system may also utilize intrinsically safe switches wherein the associated low voltage travels through wires connecting the remote switch to the pump.

Embodiments herein include those wherein the pump 10 is an automatic pump. An automatic pump includes those pumps for which no external control is required because the switch is contained within the pump body itself.

The concept of "hermetically-sealed" as found in present embodiments and alternatives is related not only to air tight and water tight construction, especially at locations on pump 10 structure wherein at least two components are mated at hermetically-sealed locations. In particular, a component is mated to an adjacent component, but also to reducing air gap between mated components and correspondingly, the path of travel of a spark, shown in the Figs. as flame path 500, to a point that a pump 10 of the present embodiments has values for air gap and flame path sufficient to qualify the pump 10 to achieve a standards rating of explosion-proof for use in a hazardous environment as such is defined by relevant standards within the industry and field. Alternative embodiments of pump 10, by virtue of being rated for use in such a hazardous environment, are provided and suitable for use in non-hazardous environments. Further alternative embodiments of pump 10 that are rated for use in a hazardous environment, are provided for use in either hazardous or non-hazardous environments, as desired by a user.

Figure 5:
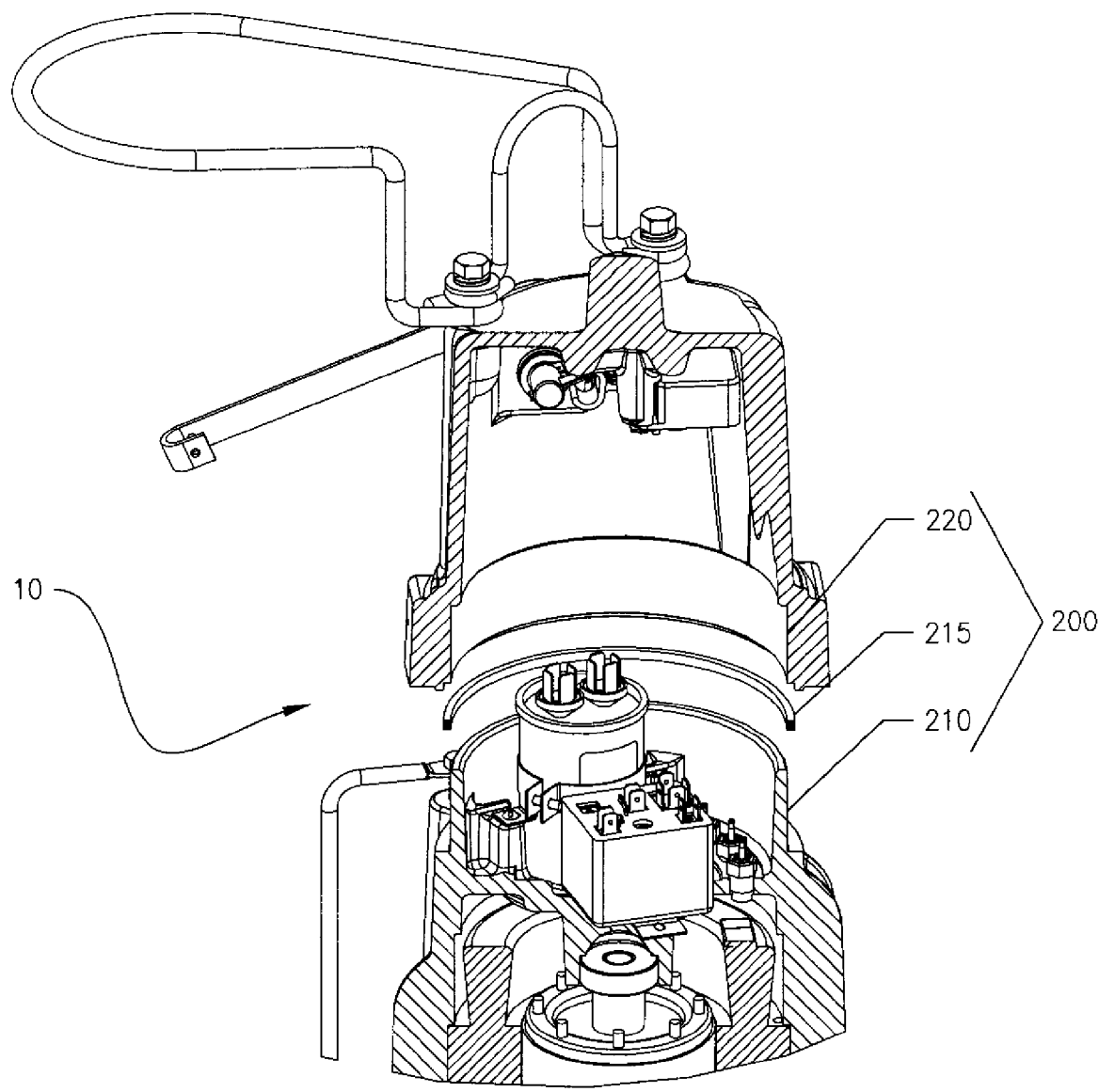
FIG. 5 is a perspective side view showing details of an explosion-proof pump according to an embodiment among multiple embodiments and alternatives.

Referring to the Figures and in particular, to FIG. 1, embodiments of pump 10 include a component, such as, for example, a switch housing 12 having a cavity 21 formed therein, a switch 20 secured in the cavity 21 wherein the component is mated to an adjacent component, such as, for example, a motor housing 100, by sealing means 200. Embodiments include those wherein the use of the sealing means 200 reduces air gap to almost nil and minimizes the flame path 500 thereby allowing pump 10 to meet applicable standards as discussed above and thereby be rated as explosion-proof. In some embodiments, the sealing means 200 is Rabbet joints. In alternative embodiments, the sealing means 200 is a combination of Rabbet and Flange such as, for example, and as depicted in FIGS. 1 and 5, a flange 210 formed on a component being the motor housing 100 received by a recess 220 formed on an adjacent component, in this case being the switch housing 12. Alternatively, as desired by a user, an adjacent component to the switch housing 12 is an access plate (not shown) instead of the motor housing 100. Such alternatives having the access plate (not shown) provide for uses wherein the user does not desire to affix the switch housing 12 to the motor housing 100. Furthermore, in such cases, a second access plate (not shown) is mated as desired to the motor housing 100 for embodiments wherein the user does not desire to affix the switch housing 12 to the motor housing 100. Alternatives including access plates (not shown) include such access plates (not shown) being mated to the switch housing 12 by sealing means 200 including but not limited to Rabbet joints or a combination of Rabbet and flange.

With continued reference to FIG. 1, an embodiment is shown wherein the motor housing 100 is affixed to an adapter housing 300 by Rabbet joint sealing means 200. An impeller 310 is contained within the impeller pump housing 305. A motor 110 is placed within the motor housing 100 in order to drive the impeller 310.

Figure 2:
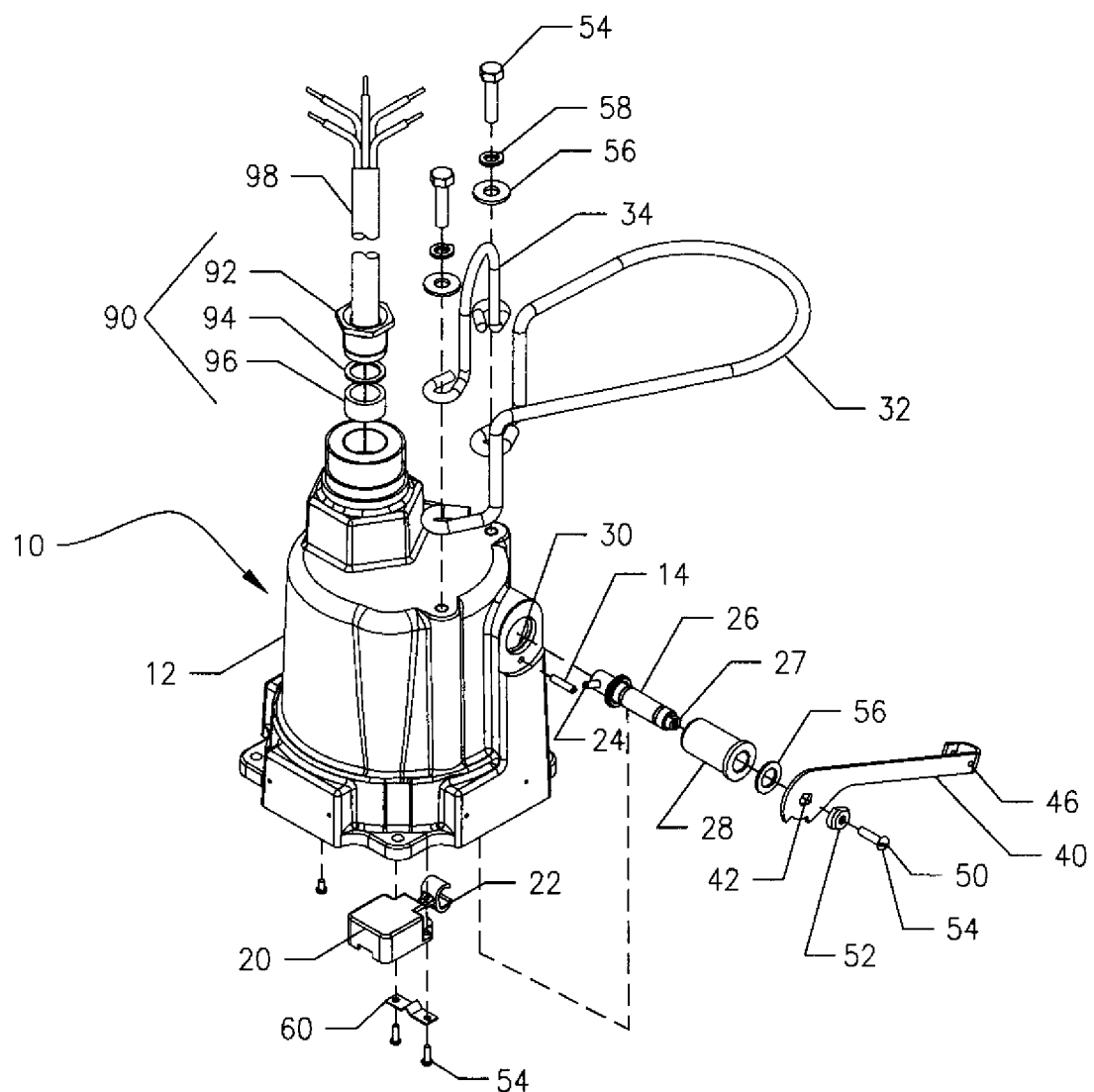
FIG. 2 is side perspective view of an explosion-proof pump according to an embodiment among multiple embodiments and alternatives.
Figure 3:
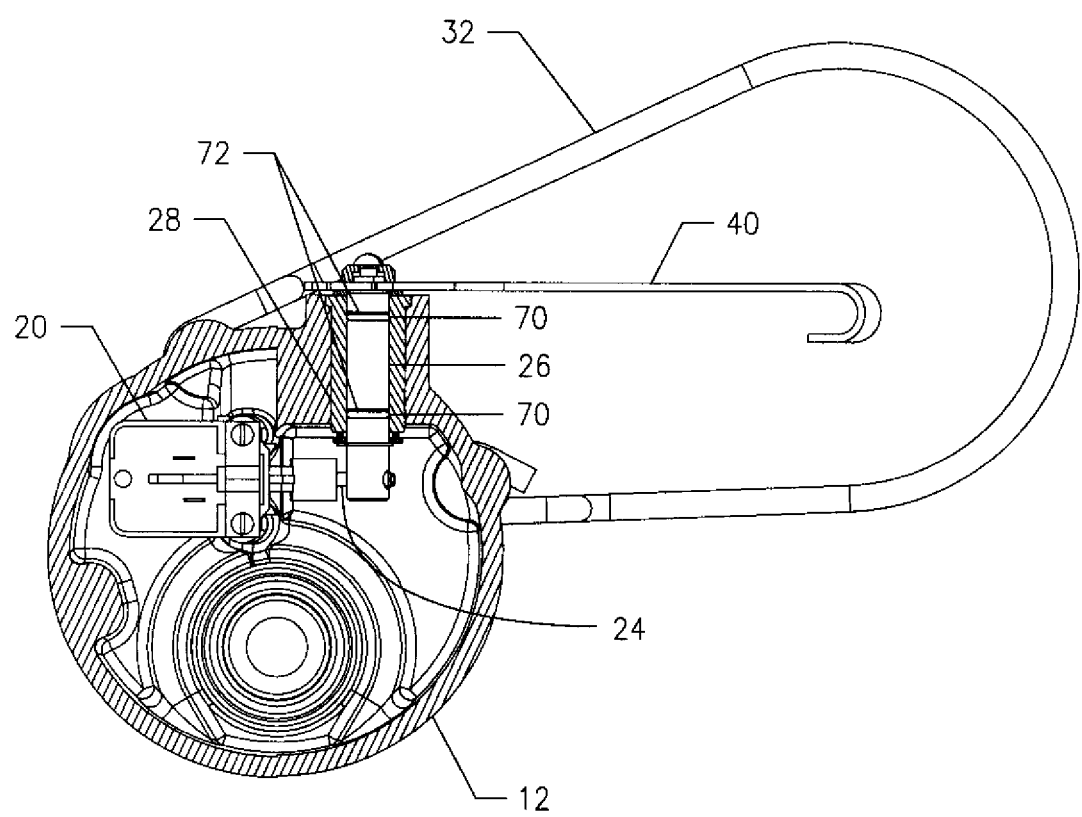
FIG. 3 is a sectioned top view of an explosion-proof pump according to an embodiment among multiple embodiments and alternatives.

In further detail and in reference to FIGS. 1 through 3, the switch 20 is secured to the switch housing 12 by a clip 60 and one or more fastening means 50 such as screws 54 depicted. The switch 20 is further arranged for mechanical actuation by utilizing a yoke 22 having a locating means formed thereupon such as, for example, a u-shaped channel, in order to adjustably receive a roll pin 24 of an actuator rod 26. The actuator rod 26 is selectably positioned to pass through one or more bushings 28. The one or more bushings 28 are affixed to an orifice 30 formed in switch housing 12. A switch arm 40 having slot 42 is correspondingly mated to a corresponding protrusion 27 formed on the actuator rod 26. Throughout the pump 10, fastening means 50 are selected by size and specification as to pitch thread, diameter, length and the like as desired and include, for example, a retainer 52 and screw 54 which secure the switch arm 40 to the actuator rod 26. As desired, a washer 56 through which bolt 54 passes is placed between the switch arm 40 and the bushing 28.

Referring to FIG. 2, a float guard 32 and a lifting bracket 34 are affixed to switch housing 12 by fastening means 50 including screws 54 which pass through lock washers 58 and washers 56. A limit pin 14 is affixed to switch housing 12 in order to achieve a desired range of motion of the switch arm 40 about a pivot point thereof. A cord seal assembly 90 includes a gland nut 92, a washer 94 and a cord seal 96. The cord seal assembly 90 allows the entry of an electric power cord 98 wherein the path of entry of the cord 98 is hermetically sealed.

Referring to FIG. 3, the actuator rod 26 further includes one or more o-rings 70 that are affixed on corresponding o-ring grooves 72 formed upon the actuator rod 26.

Figure 4:
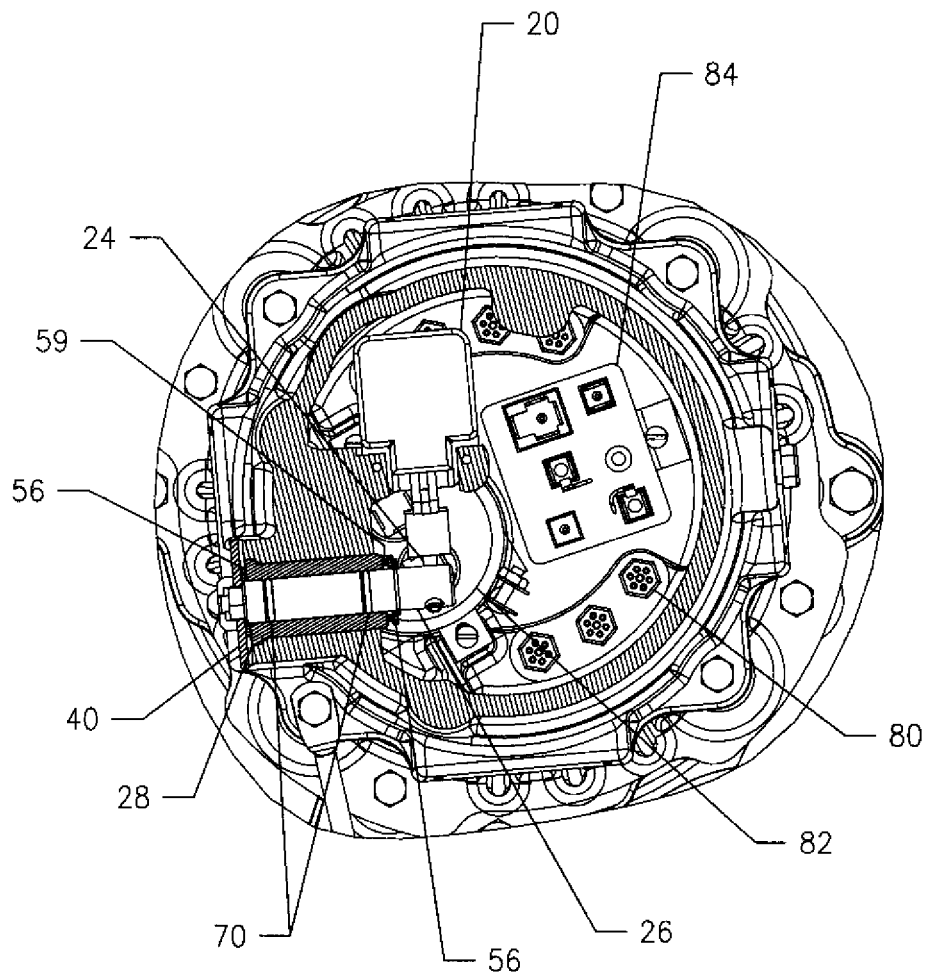
FIG. 4 is a sectioned top view showing details of an explosion-proof pump according to an embodiment among multiple embodiments and alternatives.

Referring to FIG. 4, further details are shown with respect to an embodiment having components placed within the switch housing 12 in order to achieve mechanical actuation of switch 20. A wave washer 59 is positioned inside the switch housing 12 through which the actuator rod 26 passes and adjacent to a washer 56. A thru wall terminal 80, a run capacitor 82 and a relay 84 are placed within the switch housing 12 and are thereby hermetically sealed within the switch housing 12.

Alternative embodiments include the switch 20 being magnetically actuated. For example, a reed switch is provided wherein a magnet passes in proximity to the switch 20 thereby activating a relay resulting in turning the pump 10 off or on. Other alternatives for magnetic actuation of switch 20 include those embodiments wherein opposing magnetic forces are utilized such that a magnet is affixed to a float guide rod 430, or alternatively, to the actuator rod 26. As the magnet is placed in proximity to another magnet whereby poles of both magnets having the same polarity are in closest proximity, switch arm 40 or the like is repelled thereby actuating a relay resulting in turning the pump 10 off or on.

Even further alternatives provide that switch 20 is solid-state instead of mechanically actuated.

Referring again to FIG. 1, an example of an embodiment utilizing mechanical switch actuation in conjunction with sensor means such as, for example, a float 400 is illustrated. A float rod 410 through which float 400 passes and is secured thereto is selectably positioned in relation to pump 10. The float rod 410 incorporates a float guide 420 formed thereupon at a first end and which slidably surrounds a float guide rod 430 which is affixed to pump 10 in an orientation such as, for example between the adapter housing 300 and the switch housing 12. A second end of the float shaft 410 is rotatably secured to the switch arm 40 and secured to a portion of the switch arm 40 spaced away from the pivot point of the switch arm 40 with a float rod pin 44 inserted through holes 46 formed in the switch arm 40 (FIG. 2). The controlled movement, as desired, of the float 400 places the float 400 into mechanical linkage with switch 20 thereby allowing motion of the float 400 to move the switch arm 40, thereby rotating actuator rod 26 and having the roll pin 24 exert force against switch yoke 22 and thereby operate the switch 20 resulting in selectable control of the off-on status of the pump 10.

Alternatives provide the float 400 adjustably secured to the switch body 12 alone wherein the switch body 12 is not affixed to the remainder of the pump 10. Such alternatives thereby provide for positioning of switch 20 either in or out of, submerged or non-submerged, the hazardous environment, as desired, and to allow motion of the float 400 to operate the switch 20 and thereby remotely control off-on status of the pump 10. Although switch 20 may be remotely positioned and work as described above in conjunction with float 400, embodiments and alternatives provide that the switch 20 is contained within the switch housing 12, thereby resulting in a hermetically-sealed and automatic pump. As such, switch 20, as part of hermetically-sealed and automatic pump 10, may also be located within the hazardous environment.

In operation, switch 20 oscillates repeatedly to cycle between off and on states in response to inputs from sensor means, such as, for example, one or more floats 400, in response to predetermined conditions selected by a user and associated with conditions, such as, for example, fluid levels, within a sump or other chamber (not shown) wherein the pump 10 is submerged. Embodiments provide that a high float 400 level will trigger the switch to an on state and initiate the motor 110 to spin the impeller 310 in order to pump out, or remove, intended substances to the point that the float 400 returns to a low float 400 level thereby triggering the switch 20 to an off state. Alternatives provide that a high float 400 level will trigger the switch 20 to an off state and that a low float 400 level will trigger the switch 20 to an on state.

Embodiments include the pump 10 having an oscillating switch 20 and a hermetically-sealed flame path 500. Alternatives include the pump 10 being constructed of materials to include external components being constructed of non-sparking materials and to code specification for flame path 500 in order to achieve a rating, such as, for example, an FM Listing, in accordance with accepted industry standards organizations for use in Class I, Division 1, Group C and D hazardous environments. Further embodiments include a pump 10 having an electric motor 110 including an oscillating switch 20 and a hermetically-sealed flame path 500, wherein pump 10 is submersible and automatic and pump 10 is rated in accordance with accepted industry standards organizations for use in Class I, Division 1, Group C and D hazardous environments without the need for using intrinsically safe controls. Additionally, although service in removing intended substances in the hazardous environments discussed above is contemplated, embodiments also exist and are provided for use in applications to include: dewatering; pumping effluents, such as, for example, sewage; pumping sewage solids; and, pumping effluent solids. Further embodiments provide moisture sensors and panel indicator lights (not shown) in order to further mitigate against the possibility and/or harmful effects of a moisture breach into a hermetically sealed area of the pump 10.

As to duty cycle, pumps 10 of the present embodiments selectably operate, as desired, in either an intermittent duty cycle or a continuous duty cycle.

By way of an illustrative example, consider the situation in which a vehicle maintenance shop has a shop floor that has a pooling area and a chamber, or sump, to collect intended substances to include fluid contaminants such as used motor oil, gasoline, and the like that drip down. It is desired that such fluids be pumped out and that a submersible pump be used. Pumps 10 of the present embodiments may safely operate and be placed within such a hazardous and indeed, explosive, environment as such is defined and governed by code organizations that place their seal on products submitted for testing. Present pumps 10 may rest at the bottom of the sump (not shown) and have a built-in sensor means such as, for example, one or more floats 400, which operates an oscillating switch 20 to turn the pump 10 off and on and to cycle pump 10 between off and on thereafter. In alternative embodiments wherein pump 10 does not utilize intrinsically-safe switches, the voltages necessary to operate the pump 10 mandate isolating any potential spark by forming the flame path 500 to very precise tolerances in accordance with standards as discussed above and within the pump 10 so as to avoid a spark touching off gasoline vapors or the like.

More specifically, and with reference to FIG. 5 for a further detailed view, embodiments include the sealing means 200 comprising a component having the flange 210 further having an L-shape formed thereupon in order to correspondingly mate with an L-Shape formed on a contact portion of the recess 220 of an adjacent component. Alternatives include the use of a sealing ring 215 placed into proximity with the flange 210 and the recess 220 that further serves to reduce flame path 500 as the components are secured together with fastening means 50. By denying any spark that may occur at the switch from getting past that localized area and into the outer area, outside pump 10, where, if such are present, any gas vapors would be found, the pump 10 may be safely operated in a hazardous environment. As desired, a user may selectably choose in design and manufacturing which component has a flange 210 and which adjacent component (or vice versa) has a recess 220 based on considerations such as, for example, standards and code requirements to include wall thickness and choice of materials at the intended location of component mating.

A method for Explosion-Proof Pump 10 is provided which comprises the following steps: sense a high fluid level, turn on pump, sense a low fluid level, turn off pump; and, repeat steps above upon again sensing a high fluid level. Pump operation is also provided wherein the method steps are: sense a low fluid level, turn on pump, sense a high fluid level, turn off pump; and, repeat steps above upon again sensing a low fluid level. Further method embodiments include those wherein the pump 10 is automatic. Even further embodiments include those wherein the pump 10 is utilized in applications including dewatering, effluent, sewage solids and effluent solids.

It will therefore be readily understood by those persons skilled in the art that the embodiments and alternatives of a System and Method for Explosion-Proof Pump are susceptible of a broad utility and application. While the embodiments are described in all currently foreseeable alternatives, there may be other, unforeseeable embodiments and alternatives, as well as variations, modifications and equivalent arrangements that do not depart from the substance or scope of the embodiments. The foregoing disclosure is not intended or to be construed to limit the embodiments or otherwise to exclude such other embodiments, adaptations, variations, modifications and equivalent arrangements, the embodiments being limited only by the claims appended hereto and the equivalents thereof.

We claim:

1. A system for an explosion-proof pump, comprising:
a switch housing having a cavity formed therein and being mated to and sealed against one of an access plate and a motor housing;
a switch secured in the cavity for activating and deactivating the pump;
a float having a float rod extending therefrom;
a switch arm having a pivot point, the float rod being connected to a portion of the switch arm spaced away from the pivot point;
at least one bushing affixed to and sealed against the switch housing and passing through an orifice in the switch housing;
an actuator rod rotatable about a longitudinal axis thereof and having a first end connected to the switch arm at the pivot point, the actuator rod passing through the at least one bushing into the cavity of the switch housing; and
a roll pin distinct from the actuator rod and extending radially from the actuator rod near a second end of the actuator rod adjacent to the switch such that when the float rises or falls, the float rod moves to cause the switch arm to pivot about the pivot point and rotate the actuator rod about its longitudinal axis causing the roll pin to pivot about the longitudinal axis of the actuator rod and displace the switch to activate or deactivate the pump.

2. The system of claim 1, wherein (1) a radial gap between an interior surface of the at least one bushing and the outer surface of the actuator rod and (2) a length of a flame path along the actuator rod are selected to achieve a rating of explosion-proof.

3. The system of claim 2, further comprising a pair of o-rings positioned on the actuator rod at opposite ends of the flame path along the actuator rod.

4. The system of claim 1, further comprising a yoke having a u-shaped channel formed upon the switch, wherein the roll pin extends into the u-shaped channel such that rotation of the actuator rod causes the roll pin to displace the yoke to thereby displace the switch and activate or deactivate the pump.

5. The system of claim 1, wherein the switch housing is mated to and sealed against a motor housing, the switch housing having an L-shaped recess formed along a perimeter of its inner surface, the motor housing having a flange extending along a perimeter of its outer surface, a distal end of the flange being matably received by the L-shaped recess of the switch housing, the motor housing having an L-shaped recess formed along the perimeter of its outer surface at a base of the flange, the L-shaped recess of the motor housing matably receiving a distal portion of the switch housing.

6. The system of claim 5, wherein (1) a gap between the inner surface of the switch housing and the outer surface of the flange of the motor housing and (2) a length between the L-shaped recess of the switch housing and the L-shaped recess of the motor housing are selected to achieve a rating of explosion-proof.

7. The system of claim 5, further comprising a seal positioned between the L-shaped recess of the switch housing and the flange of the motor housing.

8. The system of claim 1, further comprising a run capacitor and a relay positioned within the switch housing and coupled to the switch.

\* \* \* \* \*